(12) United States Patent
Ramanathan et al.

(10) Patent No.: US 10,802,862 B2
(45) Date of Patent: Oct. 13, 2020

(54) LIVE MIGRATION OF VIRTUAL MACHINES ACROSS HETEROGENEOUS VIRTUAL MACHINE MANAGEMENT DOMAINS

(71) Applicant: VMware, Inc., Palo Alto, CA (US)

(72) Inventors: Arunachalam Ramanathan, Palo Alto, CA (US); Yanlei Zhao, Palo Alto, CA (US); Rohan Pradip Shah, Mountain View, CA (US); Benjamin Yun Liang, San Jose, CA (US); Gabriel Tarasuk-Levin, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 106 days.

(21) Appl. No.: 15/968,704

(22) Filed: May 1, 2018

(65) Prior Publication Data

US 2019/0340003 A1 Nov. 7, 2019

(51) Int. Cl.
*G06F 9/455* (2018.01)
*G06F 16/11* (2019.01)

(52) U.S. Cl.
CPC ........ *G06F 9/45558* (2013.01); *G06F 16/128* (2019.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 7,680,919 | B2 | 3/2010 | Nelson |
| 8,239,863 | B2 * | 8/2012 | Bhat ............... G06F 9/4856 711/6 |
| 8,671,238 | B2 * | 3/2014 | Mashtizadeh ...... G06F 9/45558 711/149 |
| 8,726,273 | B2 * | 5/2014 | Le ............... G06F 9/5077 718/1 |
| 9,141,578 | B2 * | 9/2015 | Mashtizadeh ...... G06F 9/45558 |
| 9,377,963 | B2 * | 6/2016 | Colbert .............. G06F 3/0617 |

(Continued)

OTHER PUBLICATIONS

Svard et al, "Evaluation of Delta Compression Techniques for Efficient Live Migration of Large Virtual Machines", ACM 2011, pp. 111-120.*

(Continued)

*Primary Examiner* — Van H Nguyen
(74) *Attorney, Agent, or Firm* — Patterson + Sheridan, LLP

(57) ABSTRACT

A method of migrating a virtual machine (VM) having a virtual disk from a source data center to a destination data center includes generating a snapshot of the VM to create a base disk and a delta disk in which writes to the virtual disk subsequent to the snapshot are recorded, and copying the base disk to a destination data store. The method further includes, in response to a request to migrate the VM, preparing a migration specification at the source and transmitting the migration specification to the destination, the migration specification including a VM identifier and a current content ID of the base disk, and determining that a content ID of the copied base disk matches the current content ID of the base disk included in the migration specification and updating the migration specification to indicate that the base disk does not need to be migrated.

22 Claims, 3 Drawing Sheets

(56) References Cited

U.S. PATENT DOCUMENTS

| | | | |
|---|---|---|---|
| 9,495,189 B2 | 11/2016 | Shu et al. | |
| 9,588,796 B2* | 3/2017 | Tarasuk-Levin | G06F 16/273 |
| 9,626,212 B2* | 4/2017 | Beveridge | G06F 16/273 |
| 9,723,065 B2* | 8/2017 | Thakkar | H04L 67/10 |
| 9,760,443 B2* | 9/2017 | Tarasuk-Levin | G06F 11/1446 |
| 9,811,531 B2 | 11/2017 | Karamanolis et al. | |
| 10,289,684 B2* | 5/2019 | Mashtizadeh | G06F 16/119 |
| 10,382,532 B2* | 8/2019 | Thakkar | H04L 12/4641 |
| 2011/0321041 A1* | 12/2011 | Bhat | G06F 9/4856 |
| | | | 718/1 |
| 2012/0284234 A1* | 11/2012 | Mashtizadeh | G06F 16/188 |
| | | | 707/655 |

OTHER PUBLICATIONS

Zhang et al, "LayerMover: Storage Migration of Virtual Machine across Data Centers Based on Three-layer Image Structure", 2016 IEEE, pp. 400-405.*

* cited by examiner

LIVE MIGRATION OF VIRTUAL MACHINES ACROSS HETEROGENEOUS VIRTUAL MACHINE MANAGEMENT DOMAINS

BACKGROUND

The largest amount of time spent during virtual machine (VM) migration operations is the time spent during disk copy. This cost increases proportionately as a VM's disks grow in size. VMs with disks as large as tens or hundreds of terabytes is a reality today in data centers of customers, and these VMs could take days to be migrated from one data center to another.

In addition, with the expansion of cloud computing services, it is expected that customers will onboard their VMs from their on-premise data centers to the cloud in bulk. This makes it important, now more than ever, that there be an efficient solution to migrate these VMs in bulk from an on-premise data center to a data center that provides cloud computing services.

SUMMARY

One or more embodiments provide a method of migrating virtual machines from a source data center to a destination data center. In one embodiment, the source data center is an on-premise data center of a customer and the destination data center is a data center that provides cloud computing services. Each of the source and destination data centers include a server that is configured with virtual machine management software that manages virtual machines running therein. The virtual machine management software installed in the server at the destination data center includes features that enable migration of virtual machines according to embodiments even though the virtual machine management software installed in the server at the source data center is an older, legacy version. In other words, according to one embodiment, only the virtual machine management software running in the server at the destination data center needs to be modified to enable migration of virtual machines according to embodiments.

According to one embodiment, a virtual machine is migrated from a source data center to a destination data center, wherein the virtual machine has a virtual disk provisioned in a source data store at the source data center. A method of migrating the virtual machine from the source data center to the destination data store includes the steps of generating a snapshot of the virtual machine running at the source data center, such that after the snapshot, the virtual disk includes a base disk containing some or all contents of the virtual disk prior to the snapshot and a delta disk in which writes to the virtual disk subsequent to the snapshot are recorded, and copying the base disk to a destination data store at the destination data center. The method further includes, in response to a request to migrate the virtual machine from the source data center to the destination data center, preparing a migration specification at the source data center and transmitting the migration specification to the destination data center, the migration specification including an identifier of the virtual machine and a current content ID of the base disk, determining that a content ID of the copied base disk matches the current content ID of the base disk included in the migration specification and updating the migration specification to indicate that the base disk does not need to be migrated, and migrating an executing state of the virtual machine and the delta disk from the source data center to the destination data center.

Further embodiments include a non-transitory computer-readable storage medium comprising instructions that cause management servers at the source and destination data centers to carry out the above method, as well as a virtualized computer system including management servers at the source and destination data centers configured to carry out the above method.

DETAILED DESCRIPTION

Figure 1:
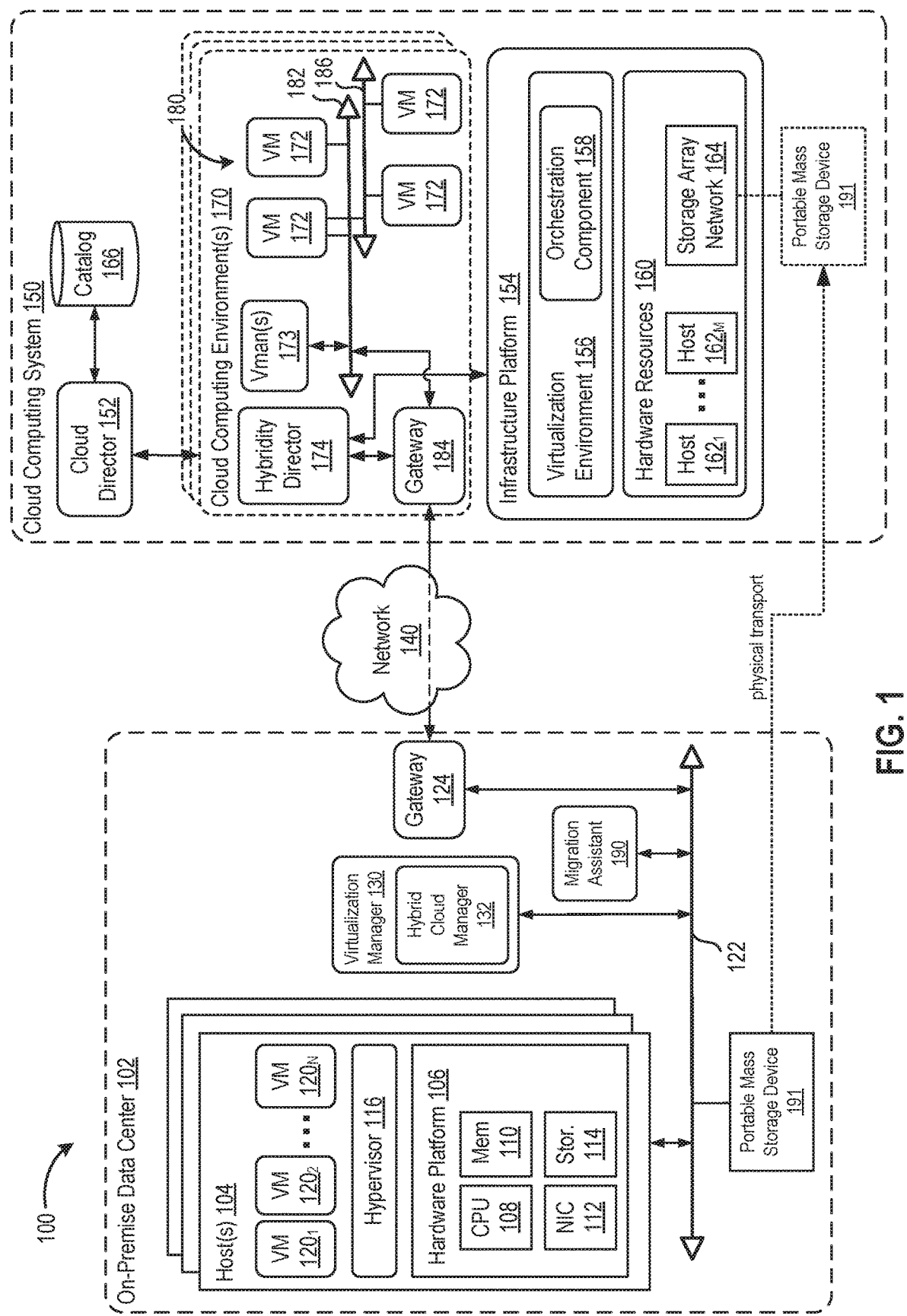
FIG. 1 is a block diagram of a hybrid cloud computing system in which one or more embodiments may be utilized.

FIG. 1 is a block diagram of a hybrid cloud computing system 100 in which one or more embodiments may be utilized. Hybrid cloud computing system 100 includes a virtualized computing system implementing an on-premise data center 102 and a virtualized computing system implementing a cloud computing system 150. Hybrid cloud computing system 100 is configured to provide a common platform for managing and executing virtual workloads seamlessly between on-premise data center 102 and cloud computing system 150. In one embodiment, on-premise data center 102 may be a data center controlled and administrated by a particular enterprise or business organization, while cloud computing system 150 may be operated by a cloud computing service provider and exposed as a service available to account holders, such as the particular enterprise in addition to other enterprises. As such, on-premise data center 102 may sometimes be referred to as a "private" cloud, and cloud computing system 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

On-premise data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, configurations, and other data, to be stored and retrieved. Memory 110 may include, for example, one or more random access memory (RAM) modules. Network interface 112 enables host 104 to communicate with another device via a communication medium, such as a network 122 within on-premise data center 102. Network interface 112 may be one or more network adapters, also referred to as a network interface controller (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) (or another NIC) that couples host 104 to one or more storage arrays, such as a storage area network (SAN) or a network-attached storage (NAS), as well as other network data storage systems, including a virtualized storage area network (VSAN), which is described in U.S. Pat. No. 9,811,531, the entire contents of which are incorporated by reference herein.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise data center 102 includes a virtualization management component (depicted in FIG. 1 as virtualization manager 130) that may communicate to the plurality of hosts 104 via network 122. In one embodiment, virtualization manager 130 is a computer program that resides and executes in a central server, which may reside in on-premise data center 102, or alternatively, running as a VM in one of hosts 104. One example of a virtualization manager is the vCenter Server™ product made available from VMware, Inc. Virtualization manager 130 is configured to manage hosts 104, VMs running within each host 104, provision VMs within hosts 104, generate snapshots of VMs, migrate VMs from one host to another host or from on-premise data center 102 to cloud computing system 150 (as will be further described below), and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, migrate VMs from on-premise data center 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise data center 102 with connectivity to an external network 140 (e.g., Internet). Gateway 124 may manage external public IP addresses for VMs 120 and route traffic incoming to and outgoing from on-premise data center 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage systems 164, such as SAN, NAS, and/or VSAN), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing on-premise data center 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud computing system 150 includes a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of virtual data centers 180 each having a plurality of virtual machines 172 instantiated to, for example, host deployed multi-tier applications, as well as one or more virtualization managers 173 (abbreviated as "Vman(s)"). Each virtual data center 180 is a logical construct that provides compute, network, and storage resources to an organization. As used herein, one such virtual data center 180 represents the destination data center to which virtual machines from the source data center, i.e., on-premise data center 102, are migrated. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Each virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within on-premise data center 102. In other embodiments, gateway 184 may be configured to connect to communicate with on-premise data center 102 using a high-throughput, dedicated link between on-premise data center 102 and cloud computing system 150. In one or more embodiments, gateways 124 and 184 are configured to provide a "stretched" layer-2 (L2) network that spans on-premise data center 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in on-premise data center 102 to enable a common virtualized computing platform between on-premise data center 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connection. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

According to embodiments, a migration assistant 190, which is a software agent running in a virtual appliance (e.g., a VM running on host 104), is implemented in on-premise data center to enable migration of virtual machines according to embodiments without modifying or upgrading the version of the software executed by virtualization manager 130. As will be described below in conjunction with FIGS. 2 and 3, migration assistant 190 communicates with virtualization manager 130 and virtualization manager 173 during migration of virtual machines from a host 104 in a virtualized computing environment managed by virtualization manager 130 to a host 162 in a virtualized computing environment managed by virtualization manager 173.

Figure 2:
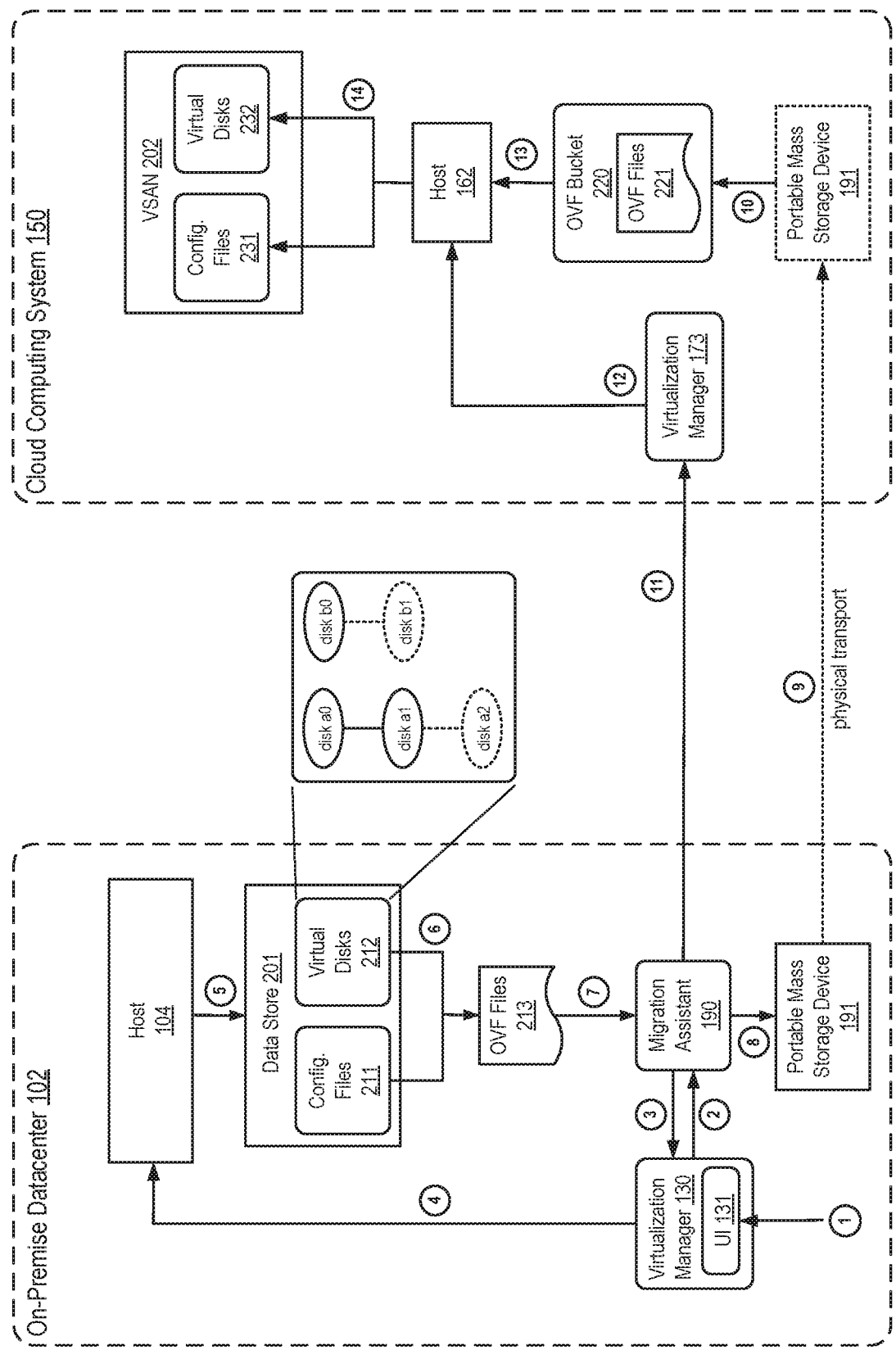
FIG. 2 is a schematic diagram illustrating the steps carried out to migrate cold data of one or more virtual machines from a source data center to a destination data center.
Figure 3:
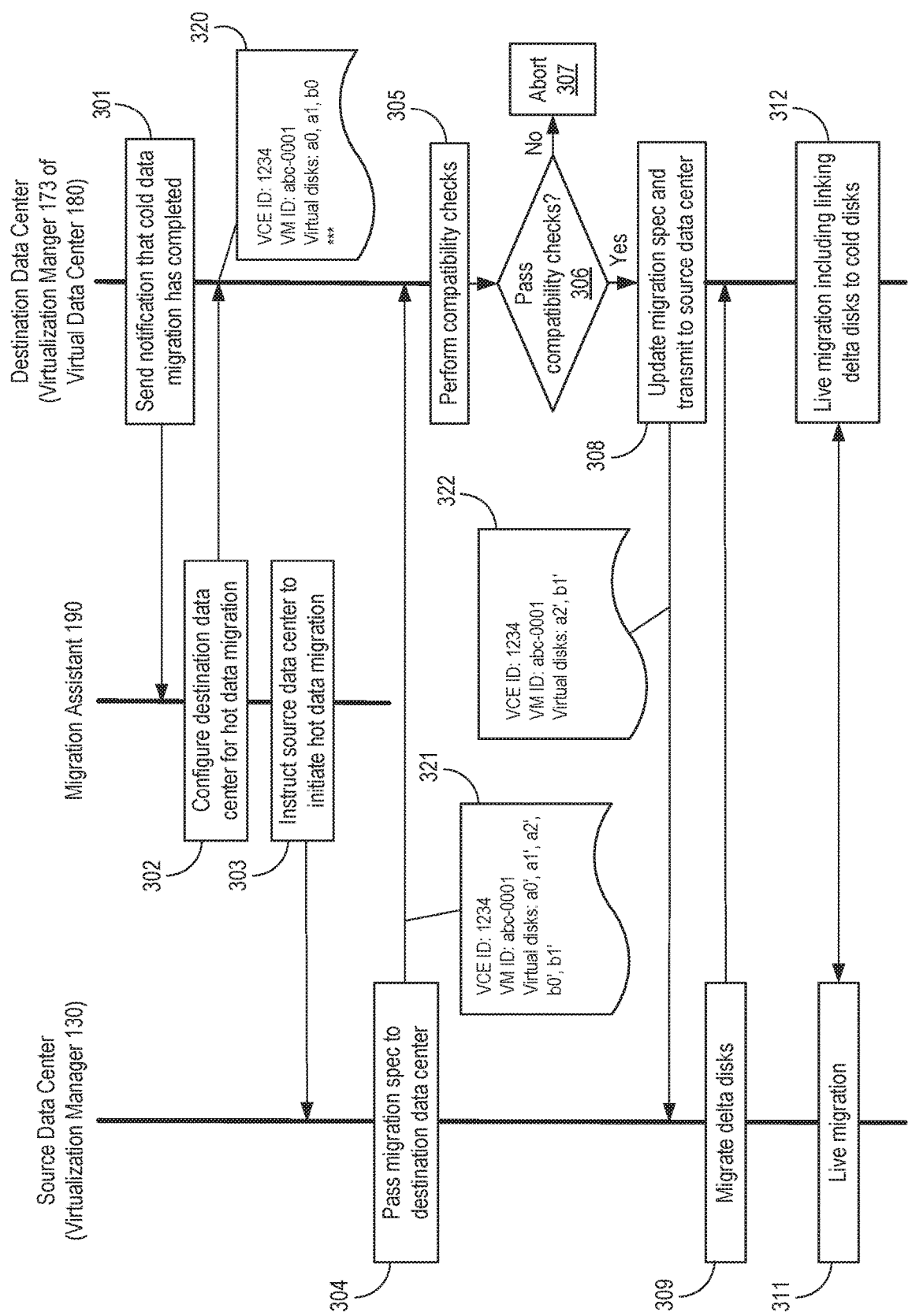
FIG. 3 is a sequence diagram illustrating the steps carried out to complete the migration of the one or more virtual machines, whose cold data were transferred from the source data center to the destination data center according to the steps of FIG. 2.

Migration of virtual machines according to embodiments is carried out in two stages. The first stage is migration of cold data, which is depicted in FIG. 2. The second stage is migration of hot data, the sequence diagram for which is illustrated in FIG. 3.

In the first stage, migration of cold data is carried out using a portable mass storage device 191 shown in FIGS. 1 and 2. Cold data of VMs to be migrated are first stored in portable mass storage device 191, and portable mass storage device 191 is then physically transported (as depicted in dotted lines in FIGS. 1 and 2) to cloud computing system 150. In one embodiment, portable mass storage device 191 is a Snowball® appliance available from Amazon Web Services, Inc., which is capable of transferring hundreds of terabytes of data, and even petabytes of data when multiple Snowball® appliances are used together.

In FIG. 2, each step carried out in the first stage is depicted with a number within circle. At step 1, a user (e.g., administrator of one-premise data center 102) accesses user interface 131 exposed by virtualization manager 130. User interface 131 provides a selection interface for selecting VMs for migration. The pool of VMs that can be selected includes all VMs running in on-premise data center 102. The number of VMs selected for migration may be several or even hundreds or thousands.

At step 2, migration assistant 190 communicates with virtualization manager 130 to obtain identifiers of VMs (VM IDs) that the user has selected for migration. For each such VM, migration assistant 190 at step 3 instructs virtualization manager 130 to generate a snapshot. In response, at step 4, virtualization manager 130 communicates with each host 104 in which the selected VMs are running to generate a snapshot for the selected VMs. When host 104 generates the snapshots at step 5, in data store 201, which may be configured as a virtual machine file system (VMFS), a network file system (NFS), or VSAN, a delta disk is provisioned for each virtual disk of each selected VM. FIG. 2 illustrates an example where one VM has two corresponding virtual disks (shown as virtual disks 212) and when host 104 generates the snapshot for this VM, two delta disks, disk a2 and disk b1, are provisioned respectively for virtual disks 212. These delta disks are illustrated in dotted lines. Subsequent to the snapshot, all writes to virtual disks 212 go to either disk a2 or disk b1. Disks a0, a1, and b0 are no longer written to and are referred to herein as cold disks. As used herein, the last disk in the chain of cold disks, e.g., disk a1 or disk b0, is referred to as a "base disk." The chain of cold disks may be generated by, for example, repeated snapshots over a period of time.

Each disk in the chain of disks that make up a virtual disk is associated with a content ID. The content ID of a disk is generated in a conventional manner and is updated on a first write executed on the disk after the disk is opened. In the embodiments, after a snapshot is taken of a virtual disk, the content ID of only the delta disk is expected to change. The content IDs of each of the cold disks are not expected to change because they are no longer being written to. Therefore, embodiments employ content IDs to perform compatibility checks to see if the cold disks that have been migrated to the destination data center have been altered in any way at the source data center. To that end, for each virtual disk of each selected VM, migration assistant 190 records content IDs of the cold disks in the chain of disks that make up the virtual disk. Thus, for virtual disks 212, migration assistant 190 records the content ID for each of disks a0, a1, b0.

At step 6, host 104 exports configuration files and all cold disks of one or more virtual disks of each selected VM (e.g., configuration files 211 and virtual disks 212) as files that are in an open virtualization format (hereinafter referred to as "OVF files 213"). Migration assistant at steps 7 and 8 streams these OVF files 213 into portable mass storage device 191 for storage therein, according to a communication protocol of portable mass storage device 191. In the example where portable mass storage device 191 is the Snowball® appliance, S3 protocol is used.

After portable mass storage device 191 stores the OVF files therein, portable mass storage device 191 is physically transported to cloud computing system 150 (step 9).

In the embodiments, OVF files are used because the OVF standard provides compression. As such, OVF files require less storage space than corresponding VM configuration files and virtual disks. In alternative embodiments, VM configuration files and virtual disks are streamed to portable mass storage device 191 for storage therein, without compression or with compression according to a different standard.

At cloud computing system 150, at step 10, portable mass storage device 191 is connected to an OVF bucket 220, which is a data container provisioned in a storage system of cloud computing system 150 that is capable of understanding the communication protocol of portable mass storage device 191 (e.g., compliant with simple storage service (S3) protocol where portable mass storage device 191 is the Snowball® appliance). Consequently, OVF files 213 stored in portable mass storage device 191 are streamed into OVF bucket 220. After all OVF files 213 stored in portable mass storage device 191 are transferred into OVF bucket 220 and stored therein as OVF files 221, portable mass storage device 191 may be returned to the owner if leased.

Then, at step 11, migration assistant 190 communicates with OVF bucket 220 to prepare a public URL and virtualization manager 173 to provision a host for reading the OVF files in OVF bucket 220 using the public URL, decompress them, and store them in a data store managed by virtualization manager 173. At step 12, virtualization manager 173 provisions host 162 to carry out this task. Once host 162 is designated by virtualization manager 173, host 162 at steps 13 and 14 reads OVF files 221, decompresses them, and stores them in the data store managed by virtualization manager 173, e.g., into VSAN 202, as configuration files 231 and virtual disks 232. After step 14, migration of cold data of VMs to be migrated is completed. When host 162 imports OVF files 221 into VSAN 202 as VMs, the VMs become registered with virtualization manager 173. This causes each of the VMs selected for migration to have two instances, one at the source data center and another at the destination data center. To prevent the VMs in cloud computing system 150 from being powered on and changing the content of their corresponding cold disks, migration assistant 190 at the conclusion of step 14 communicates with virtualization manager 173 to unregister these VMs and delete their corresponding configuration files.

The migration of hot data is carried out according to the sequence diagram illustrated in FIG. 3. The sequence diagram of FIG. 3 illustrates steps carried out by virtualization manager 130 at the source data center, migration assistant 190, and virtualization manager 173 of virtual data center 180 at the destination data center.

The migration of hot data of VMs to be migrated (i.e., the VMs selected in step 1 depicted in FIG. 2), can occur any time after cold data migration has completed. As used herein, "hot data" corresponds to data that have been written into delta disks while the cold data migration is being carried out and all of runtime data of the VMs.

Accordingly, the second stage begins at step 301 with virtualization manager 173 sending a notification to migration assistant 190 that cold data migration for the VMs to be migrated have completed. Then, at step 302, migration assistant 190 configures the destination data center for hot data migration by transmitting to virtualization manager 173 the following information for each of the VMs: identifier of virtualized computing environment managed by virtualization manager 130 (hereinafter referred to as "VCE ID"), VM ID, and content IDs of the cold disks of the VM. FIG. 3 provides one example of the configuration information for the VMs to be migrated. As illustrated, configuration information 320 of the VMs to be migrated identifies one of the VMs to be migrated as having an ID of abc-0001 and running in virtualized computing environment having an ID of 1234. Configuration information 320 also contains content IDs of cold disks of this VM (of which migration has already completed in accordance with the method depicted in FIG. 2), and for simplicity, the content IDs of these cold disks are shown in configuration information 320 as a0, a1, and b0.

After step 302, migration assistant 190 instructs the source data center to initiate migration of hot data of the VMs (step 303). At steps 304 and 305, virtualization manager 130 communicates with virtualization manager 173 to carry out the preliminary steps of the hot data migration. For each VM to be migrated, virtualization manager 130 at step 304 prepares a migration specification indicating VCE ID, VM ID and current content IDs of all disks that it will be migrating. FIG. 3 provides one example of the migration specification. This migration specification 321 is a migration specification prepared for VM abc-0001 running in VCE 1234, and identifies all disks associated with this VM and their current content IDs (e.g., a0', a1', a2', b0', b1').

At step 305, virtualization manager 173 performs a compatibility check for each VM to confirm that content IDs of cold disks have not changed (since the time they were streamed into portable mass storage device 191) by comparing current content IDs of the cold disks in the migration specification with content IDs of the corresponding cold disks as obtained from migration assistant 190 at step 302 (e.g., by comparing a0 with a0', a1 with a1', and b0 with b0'). If the compatibility check fails for any VM (step 306, No), the migration of that VM is aborted at step 307.

On the other hand, if the compatibility check passes (step 306, Yes), virtualization manager 173 updates the migration specification to indicate that the cold disks in the migration specification do not need to be migrated, and transmits the updated migration specification to virtualization manager 130 (step 308). For example, if none of the cold disks of VM abc-0001 running in VCE 1234 have changed, content IDs, a0, a1, and b0, would match with current content IDs, a0', a1', and b0', respectively, and virtualization manager 173 updates the migration specification to remove the matching current content IDs from migration specification 321. The updated migration specification transmitted to virtualization manager 130 is shown as migration specification 322.

Upon receipt of each updated migration specification, virtualization manager 130 at step 309 transmits data of the disks that still need to be migrated according to the updated migration specification (e.g., delta disks having content IDs a2' and b1'). Upon receipt of the data of the delta disks, virtualization manager 173 stores them in the data store and, at steps 311 and 312, communicates with virtualization manager 173 to carry out live migration of the execution state of the selected VMs in the conventional manner, as described in U.S. Pat. No. 7,680,919, the entire contents of which are incorporated by reference herein. During live migration, virtualization manager 173 links the delta disks to its corresponding cold disks. In the example given herein, delta disk having content ID a2' is linked with cold disk having content ID a1 (which is linked with cold disk having content ID a0), and delta disk having content ID b1' is linked with cold disk having content ID b0.

Subsequently, at steps 311 and 312, virtualization manager 130 communicates with virtualization manager 173 to carry out live migration of the execution state of the selected VMs in the conventional manner, as described in U.S. Pat. No. 7,680,919.

In the embodiments described above, cold data migration is carried out using portable mass storage device 191. In another embodiment, cold data migration is carried out using virtual disk replication techniques, for example, in connection with providing disaster recovery services.

In addition, embodiments may be applied in general when migrating virtual machines between heterogeneous virtual machine management domains by modifying the destination virtual machine management domain in the same manner described above for virtualization manager 173 and deploying migration assistant 190 at the source data center. In one embodiment, virtual machines to be migrated from the source data center are managed by a source server executing a first virtual machine management software and virtual machines in the destination data center are managed by a destination server executing a second virtual machine management software, which is an updated version of the first virtual machine management software.

In the embodiments described above, virtualization manager 130 at the source data center is assumed to be a version that is not capable of updating the migration specification. In embodiments where virtualization manager 130 at the source data center is a version that is capable of updating the migration specification, step 302 is skipped and updating of the migration specification will be carried out by virtualization manager 130.

Furthermore, in the embodiments described above, VMs are migrated between a private data center and a public data center. In other embodiments, VM migration may be carried out in the reverse direction from the pubic data center to the private data center, and between two private data centers managed by the same or different virtualization managers.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating a virtual machine from a source data center to a destination data center, the virtual machine having a virtual disk provisioned in a source data store at the source data center, said method comprising:
   generating a snapshot of the virtual machine running at the source data center, such that after the snapshot, the virtual disk includes a base disk containing some or all contents of the virtual disk prior to the snapshot and a delta disk in which writes to the virtual disk subsequent to the snapshot are recorded;
   copying the base disk to a destination data store at the destination data center; and
   in response to a request to migrate the virtual machine from the source data center to the destination data center;
   (i) preparing a migration specification at the source data center and transmitting the migration specification to the destination data center, the migration specification including an identifier of the virtual machine and a current content identifier of the base disk, wherein a content identifier of a disk is updated when a write is executed on the disk;
   (ii) determining that a content identifier of the copied base disk matches the current content identifier of the base disk included in the migration specification and updating the migration specification to indicate that the base disk does not need to be migrated; and
   (iii) based on the content identifier of the copied base disk matching the current content identifier of the base disk included in the migration specification, migrating an executing state of the virtual machine and the delta disk from the source data center to the destination data center without migrating the base disk.

2. The method of claim 1, wherein the migration specification is updated at the destination data center.

3. The method of claim 1, further comprising:
   in response to the request to migrate the virtual machine from the source data center to the destination data center, prior to preparing the migration specification, transmitting the identifier of the virtual machine to the destination data center and the content identifier of the base disk, to the destination data center.

4. The method of claim 3, further comprising:
prior to receiving the request to migrate the virtual machine from the source data center to the destination data center, exporting the base disk as an open virtualization format file, storing the open virtualization format file in a portable mass storage device, and recording the content identifier of the base disk at the time of the exporting; and
physically transporting the portable mass storage device to the destination data center; and
restoring the base disk in the destination data store from the open virtualization format file stored in the portable mass storage device.

5. The method of claim 4, wherein the portable mass storage device, at the time of the physical transport from the source data center to the destination data center, contains base disks of a plurality of virtual machines that are to be migrated from the source data center to the destination data center.

6. The method of claim 5, further comprising:
selecting the plurality of virtual machines that are to be migrated from the source data center to the destination data center, wherein
the plurality is a subset of all virtual machines running in the source data center.

7. The method of claim 6, wherein the source data center is implemented in a private cloud computing system of a first tenant and the destination data center is a virtual data center implemented in a public cloud computing system that is shared by a plurality of tenants including the first tenant, and the first tenant selects the plurality of virtual machines that are to be migrated from the source data center to the destination data center.

8. The method of claim 1, wherein
the virtual machine running in the source data center is managed by a source server executing a first virtual machine management software and virtual machines running in the destination data center are managed by a destination server executing a second virtual machine management software, which is an updated version of the first virtual machine management software.

9. The method of claim 1, wherein the virtual machine has one or more additional virtual disks provisioned in the source data store.

10. The method of claim 1, wherein
after the snapshot, the virtual disk includes a chain of cold disks, one of which is the base disk, and the delta disk, and
the cold disks chain contain all contents of the virtual disk prior to the snapshot.

11. The method of claim 10, wherein
all of the cold disks, including the base disk, are copied to the destination data store at the destination data center from a portable mass storage device at the destination data center, and
content identifiers of all of the cold disks are included in the migration specification and the content identifiers of the copied disks are matched with corresponding current content identifiers included in the migration specification.

12. A virtualized computer system comprising a source data center in which a virtual machine is running, the virtual machine having a virtual disk provisioned in a source data store at the source data center, and a destination data center in which the virtual machine is to be migrated, wherein:
the source data center includes a source server that manages virtual machines running in the source data center and the destination data center includes a destination server that manages virtual machines running in the destination data center;
the source server is configured to generate a snapshot of the virtual machine running at the source data center, such that after the snapshot, the virtual disk includes a base disk containing some or all contents of the virtual disk prior to the snapshot and a delta disk in which writes to the virtual disk subsequent to the snapshot are recorded;
the destination server is configured to copy the base disk to a destination data store at the destination data center; and
in response to a request to migrate the virtual machine from the source data center to the destination data center;
  (i) the source server prepares a migration specification and transmits the migration specification to the destination server, the migration specification including an identifier of the virtual machine and a current content identifier of the base disk, wherein a content identifier of a disk is updated when a write is executed on the disk;
  (ii) the destination server determines that a content identifier of the copied base disk matches the current content identifier of the base disk included in the migration specification, wherein the migration specification is updated to indicate that the base disk does not need to be migrated; and
  (iii) based on the content identifier of the copied base disk matching the current content identifier of the base disk included in the migration specification, the source server and the destination server cooperate to migrate an executing state of the virtual machine and the delta disk from the source data center to the destination data center without migrating the base disk.

13. The system of claim 12, wherein the migration specification is updated by the destination server.

14. The system of claim 12, wherein
the source data center further includes a migration assistant running in a virtual machine, and
in response to the request to migrate the virtual machine from the source data center to the destination data center, and before the source server prepares the migration specification, the migration assistant transmits the identifier of the virtual machine and the content identifier of the base disk, to the destination server.

15. The system of claim 14, further comprising:
prior to receiving the request to migrate the virtual machine from the source data center to the destination data center, a host running the virtual machine exports the base disk as an open virtualization format file and the migration assistant stores the open virtualization format file in a portable mass storage device and records the content identifier of the base disk at the time of the exporting; and
after the portable mass storage device has been physically transported to the destination data center, the destination server causes the base disk to be restored in the destination data store from the open virtualization format file stored in the portable mass storage device.

16. The system of claim 15, wherein the portable mass storage device, at the time of the physical transport from the source data center to the destination data center, contains base disks of a plurality of virtual machines that are to be migrated from the source data center to the destination data center.

17. The system of claim 16, wherein
the source server exposes a selection interface by which the plurality of virtual machines that are to be migrated from the source data center to the destination data center are selected, wherein
the plurality is a subset of all virtual machines running in the source data center.

18. The system of claim 17, wherein the source data center is implemented in a private cloud computing system of a first tenant and the destination data center is a virtual data center implemented in a public cloud computing system that is shared by a plurality of tenants including the first tenant, and the first tenant selects the plurality of virtual machines that are to be migrated from the source data center to the destination data center using the selection interface.

19. The system of claim 12, wherein
the source server executes therein a first virtual machine management software to manage the virtual machine to be migrated and the destination server executes therein a second virtual machine management software, which is an updated version of the first virtual machine management software, to manage virtual machines running in the destination data center.

20. The system of claim 12, wherein the virtual machine has one or more additional virtual disks provisioned in the source data store.

21. The system of claim 12, wherein
after the snapshot, the virtual disk includes a chain of cold disks, one of which is the base disk, and the delta disk, and
the cold disks in the chain contain all contents of the virtual disk prior to the snapshot.

22. The system of claim 21, wherein
content identifiers of all of the disks are included in the migration specification, and
the destination server is configured to copy all of the cold disks, including the base disk, to the destination data store at the destination data center, and determine that the content identifiers of the copied disks match corresponding current content identifiers included in the migration specification.

* * * * *